(12) United States Patent
Kato et al.

(10) Patent No.: US 6,961,649 B2
(45) Date of Patent: Nov. 1, 2005

(54) VEHICLE MOTION CONTROL APPARATUS

(75) Inventors: Toshihisa Kato, Handa (JP); Junya Nagaya, Kariya (JP)

(73) Assignee: Advics Co., Ltd., Kariya (JP)

( * ) Notice: Subject to any disclaimer, the term of this patent is extended or adjusted under 35 U.S.C. 154(b) by 0 days.

(21) Appl. No.: 10/892,322

(22) Filed: Jul. 16, 2004

(65) Prior Publication Data

US 2005/0015192 A1    Jan. 20, 2005

(30) Foreign Application Priority Data

Jul. 17, 2003   (JP) ............................. 2003-275797

(51) Int. Cl.[7] .............................................. G06G 7/76
(52) U.S. Cl. ........................... 701/70; 701/78; 701/80; 701/83
(58) Field of Search .............................. 701/36, 70, 71, 701/76, 78–83; 180/197; 188/140 R, 141; 303/2, 3, 10, 11, 121, 122.01

(56) References Cited

U.S. PATENT DOCUMENTS

| | | | |
|---|---|---|---|
| 4,898,431 A | 2/1990 | Karnopp et al. | |
| 5,893,896 A | * 4/1999 | Imamura et al. | ............... 701/70 |
| 5,913,578 A | 6/1999 | Tozu et al. | |
| 6,216,079 B1 | * 4/2001 | Matsuda | ....................... 701/70 |
| 6,278,929 B1 | * 8/2001 | Tozu et al. | .................... 701/70 |
| 6,463,378 B2 | * 10/2002 | Nishio | ......................... 701/70 |

FOREIGN PATENT DOCUMENTS

| | | |
|---|---|---|
| JP | 10-129441 | 5/1998 |
| JP | 2884789 | 2/1999 |
| JP | 3058172 | 4/2000 |

* cited by examiner

*Primary Examiner*—Richard M. Camby
(74) *Attorney, Agent, or Firm*—Buchanan Ingersoll PC (57) ABSTRACT

The present invention is directed to a vehicle motion control apparatus, which includes a hydraulic pressure regulating device disposed between a master cylinder and a pair of wheel brake cylinders included in each of a dual hydraulic circuit, and a monitor for monitoring state variable of the vehicle. It is determined whether a wheel out of the wheels operatively associated with the pair of wheel brake cylinders is located on the inside of a curve along which the vehicle is turning, or located on the outside of the curve. Also, a state of road holding of the wheel located on the inside of the curve is determined. A desired value for the wheel located on the outside of the curve is set at least on the basis of the road holding determination. And, the pressure regulating device is controlled in response to a result of comparison between the desired value and the monitored state variable, to regulate the hydraulic braking pressure in the wheel brake cylinder operatively associated with the wheel located on the outside of the curve, whereby the vehicle is decelerated smoothly, when the wheel located on the inside of the curve has come to be apart from the road.

7 Claims, 7 Drawing Sheets

VEHICLE MOTION CONTROL APPARATUS

This application claims priority under 35 U.S.C. Sec. 119 to No. 2003-275797 both filed in Japan on Jul. 17, 2003, the entire content of which is herein incorporated by reference.

BACKGROUND OF THE INVENTION

1. Field of the Invention

The present invention relates to a vehicle motion control apparatus, particularly relates to the vehicle motion control apparatus for regulating a hydraulic braking pressure supplied to at least one wheel brake cylinder out of a pair of wheel brake cylinders included in a hydraulic circuit, to restrain an excessive oversteer and/or an excessive understeer, thereby to maintain stability of a vehicle in motion.

2. Description of the Related Arts

As for a vehicle motion control apparatus, there is disclosed in Japanese Patent No. 3058172, which corresponds to the U.S. Pat. No. 4,898,431, for example, an apparatus for controlling vehicle motion, by determining a desired yaw rate of a vehicle, and controlling braking force in response to a comparison of the desired yaw rate with a sensed actual yaw rate of the vehicle to maintain a vehicle stability during the vehicle motion. Also, in Japanese Patent Laid-open publication No. 10-129441, which corresponds to the U.S. Pat. No. 5,913,578, proposed is a vehicle motion control system for setting desired slip rates for use in oversteer restraining control and understeer restraining control on the basis of a vehicle state, and regulating hydraulic braking pressure in each wheel brake cylinder on the basis of each desired slip rate.

In Japanese Patent No. 2884789, as front wheels tend to be locked earlier than rear wheels according to an ordinary vehicle, it has been noted as an issue to be solved that the vehicle tends to be in the understeer state, when a rapid braking is made while the vehicle is turning along a curve, with high lateral acceleration applied to the vehicle. In order to prevent that state, proposed is an anti-skid control apparatus for decreasing the braking force applied to wheels located on the outside of the curve to be smaller than the braking force applied to wheels located on the inside of the curve, thereby to apply a yaw moment for canceling the tendency of the understeer state. And, it is proposed to set a slip rate for use in an anti-skid actuator provided for the wheel located on the outside of the curve to be smaller than the slip rate provided for the wheel located on the inside of the curve, with the lateral acceleration being made higher.

According to the system and apparatus as disclosed in the Japanese Patent No. 3058172 and publication No. 10-129441, a control for maintaining a stability of the vehicle in motion (i.e., vehicle stability control) is performed. Therefore, an excessive understeer can be restrained by regulating the hydraulic braking pressure in a wheel brake cylinder out of a pair of wheel brake cylinders included in a common hydraulic circuit, for example. In general, in order to restrain the excessive understeer, the hydraulic braking pressure is supplied to the wheel brake cylinder operatively associated with the wheel located on the inside of the curve. In the case where the wheel located on the inside of the curve has been apart from a road surface to be positioned in a floating state, however, supplying the hydraulic braking pressure to the wheel brake cylinder operatively associated with the wheel located on the inside of the curve could not act as the understeer restraining control. In this case, therefore, it is preferable to supply appropriate hydraulic braking pressure to the wheel brake cylinder operatively associated with the wheel located on the outside of the curve, thereby to increase the vehicle deceleration, to result in restraining the excessive understeer.

In the mean time, according to the system and apparatus as disclosed in the Japanese Patent No. 3058172 and publication No. 10-129441, the control is not necessarily undertaken when a brake pedal is depressed, so that the operation of the brake pedal is not used for a condition for undertaking the control. As the Japanese Patent No. 2884789 relates to the anti-skid control apparatus, which may be included in the category of the system and apparatus as described above, means for solving a specific issue for the anti-skid control may not be used to solve various issues caused in the vehicle motion control performed by the system and apparatus as described above. For example, it has been employed as the issue to be solved, in Japanese Patent No. 2884789 as described above, that the vehicle tends to be in the understeer state, when the rapid braking is made during the vehicle's turning operation, and it has been proposed as a countermeasure that the slip rate provided for the wheel located on the outside of the curve is set to be smaller than the slip rate provided for the wheel located on the inside of the curve. That countermeasure does not directly relate to applying the braking force to the wheel located on the inside of the curve, for example, when the understeer restraining control is undertaken during the vehicle's turning operation, according to the system and apparatus as disclosed in the Japanese Patent No. 3058172 and publication No. 10-129441, and it is not applicable for solving the issue caused in the state where the wheel is positioned in its floating state during the understeer restraining control, as described before.

SUMMARY OF THE INVENTION

Accordingly, it is an object of the present invention to provide a vehicle motion control apparatus for performing a vehicle stability control appropriately, with a simple structure, and performing an understeer restraining control when the vehicle turns along a curve, to shift it to a vehicle decelerating control smoothly, when the wheel located on the inside of the curve has come to be in its floating state.

In accomplishing the above and other objects, the vehicle motion control apparatus includes wheel brake cylinders operatively associated with wheels of a vehicle, respectively, and a master cylinder which is connected to the wheel brake cylinders through a dual hydraulic circuit with a pair of wheel brake cylinders included in each hydraulic circuit, and which discharges a hydraulic braking pressure into each hydraulic circuit in response to operation of a brake pedal. Between the master cylinder and the pair of wheel brake cylinders, a hydraulic pressure regulating device is provided for regulating the hydraulic braking pressure supplied into each of the pair of wheel brake cylinders. A vehicle state monitor is provided for monitoring state variable of the vehicle. A turning determination unit is provided for determining whether a wheel out of the wheels operatively associated with the pair of wheel brake cylinders is located on the inside of a curve along which the vehicle is turning, or located on the outside of the curve. A road holding determination unit is provided for determining a state of road holding of the wheel determined by turning determination unit to be located on the inside of the curve. A desired value setting unit is provided for setting a desired value for the wheel determined by turning determination unit to be located on the outside of the curve, at least in response to the result determined by the road holding determination unit.

And, a control unit is provided for controlling the pressure regulating device in response to a result of comparison between the desired value set by the desired value setting unit and the state variable monitored by the vehicle state monitor, to regulate the hydraulic braking pressure in the wheel brake cylinder operatively associated with the wheel located on the outside of the curve.

In the apparatus as described above, the desired value setting unit may set the desired value for the wheel located on the outside of the curve to be a predetermined value for undertaking the regulation by the pressure regulating device, when the road holding determination unit determines that the wheel located on the inside of the curve is apart from a road, and the desired value setting unit may set the desired value for the wheel located on the outside of the curve, on the basis of a braking condition of at least one wheel out of the wheels of the vehicle except the wheel located on the inside of the curve and the wheel located on the outside of the curve, when the road holding determination unit determines that the wheel located on the inside of the curve is on the road.

Preferably, the desired value setting unit modifies the desired value for the wheel located on the outside of the curve to increase the braking force applied thereto, when an anti-skid control is undertaken by the control unit for at least the one wheel except the wheel located on the inside of the curve and the wheel located on the outside of the curve.

In the apparatus as described above, the vehicle state monitor may includes a wheel speed detection device for detecting a wheel speed for each wheel of the wheels, a vehicle speed estimation unit for estimating a vehicle speed on each wheel on the basis of the wheel speed detected by the wheel speed detection device, and an actual slip rate calculation unit for calculating an actual slip rate for each wheel, on the basis of the vehicle speed estimated by the vehicle speed estimation unit and the wheel speed detected by the wheel speed detection device. The control unit may include an outside desired slip rate setting unit for setting a desired slip rate for the wheel located on the outside of the curve, and an outside slip rate deviation calculation unit for calculating a deviation between the desired slip rate set by the outside desired slip rate setting unit and the actual slip rate calculated by the actual slip rate calculation unit. The control unit may control the pressure regulating device in response to the result calculated by the outside slip rate deviation calculation unit, to regulate the hydraulic braking pressure in the wheel brake cylinder operatively associated with the wheel located on the outside of the curve.

Preferably, the vehicle state monitor may include a yaw rate detection device for detecting an actual yaw rate of the vehicle, and the control unit may include a desired yaw rate setting unit for setting a desired yaw rate for the wheel located on the inside of the curve, a yaw rate deviation calculation unit for calculating a deviation between the desired yaw rate set by the desired yaw rate setting unit and the actual yaw rate detected by the yaw rate detection device, an inside desired slip rate setting unit for setting a desired slip rate for the wheel located on the inside of the curve, on the basis of the deviation calculated by the yaw rate deviation calculation unit, and an inside slip rate deviation calculation unit for calculating a deviation between the desired slip rate set by the inside desired slip rate setting unit and the actual slip rate calculated by the actual slip rate calculation unit. And, the control unit may control the pressure regulating device in response to the result calculated by the inside slip rate deviation calculation unit, to regulate the hydraulic braking pressure in the wheel brake cylinder operatively associated with the wheel located on the inside of the curve.

BRIEF DESCRIPTION OF THE DRAWINGS

The above stated object and following description will become readily apparent with reference to the accompanying drawings, wherein like referenced numerals denote like elements, and in which.

DESCRIPTION OF THE PREFERRED EMBODIMENTS

Figure 1:
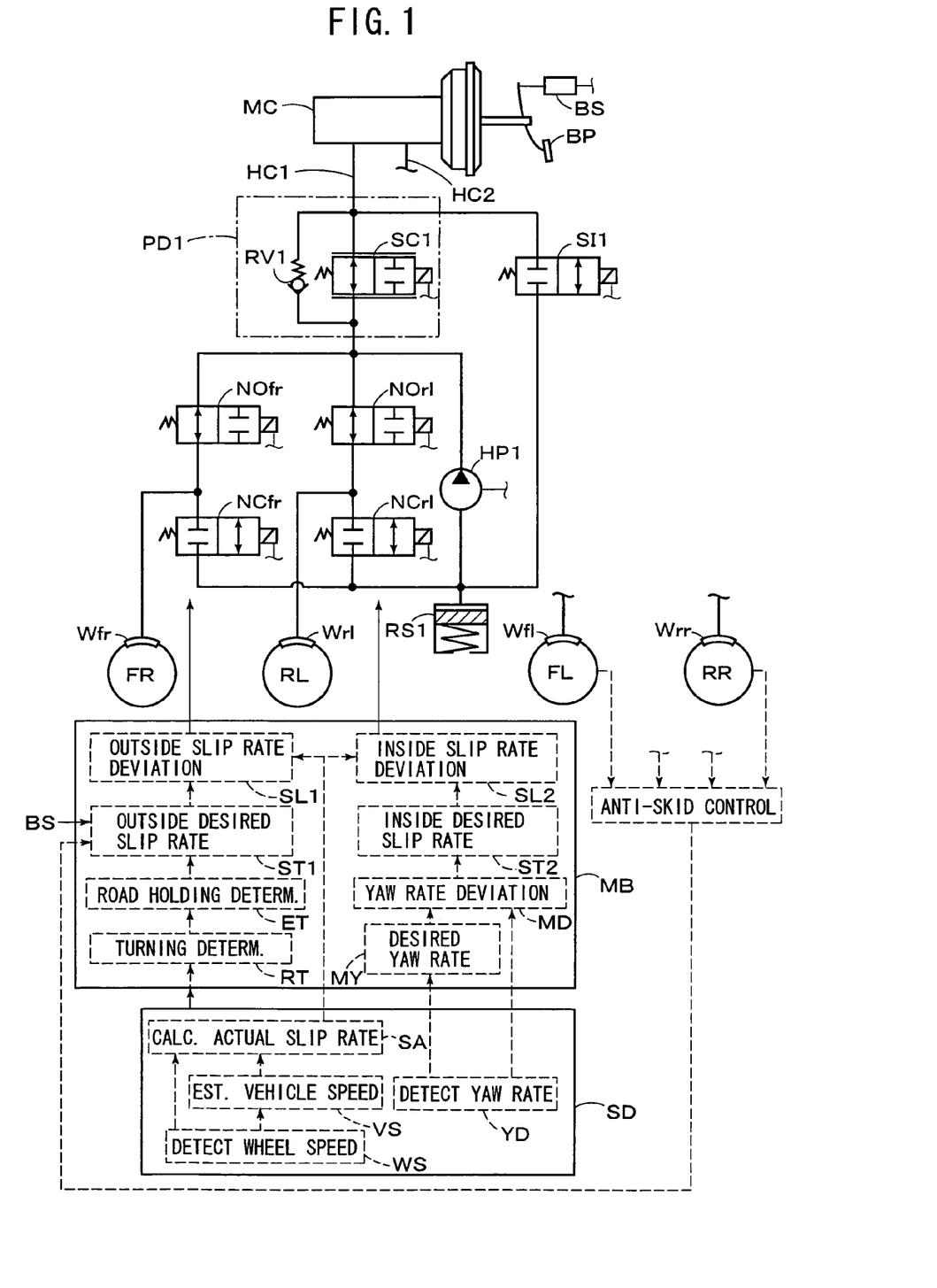
FIG. 1 is a schematic block diagram of a vehicle motion control apparatus according to an embodiment of the present invention.

Referring to FIG. 1, there is schematically illustrated a vehicle motion control apparatus according to the present invention, with a dual hydraulic circuit divided into one hydraulic circuit (HC1) and the other hydraulic circuit (HC2), the latter of which is substantially the same as the former one, and therefore omitted in FIG. 1. The hydraulic circuit (HC1) includes a pair of wheel brake cylinders Wrl and Wfr which are operatively associated with wheels RL and FR of a vehicle, respectively. A master cylinder MC is connected to the wheel brake cylinders (including Wrl and Wfr) through the dual hydraulic circuit, to discharge a hydraulic braking pressure into each hydraulic circuit in response to operation of a brake pedal BP. And, normally open solenoid operated switching valves NOrl and NOfr (hereinafter, simply referred to as normally open valves NOrl and NOfr) are each disposed between the master cylinder MC and each of the wheel brake cylinders Wrl and Wfr. When each of the normally open valves NOrl and NOfr is placed in an open position thereof, the hydraulic braking pressure discharged from the master cylinder MC is supplied into each of the wheel brake cylinders Wrl and Wfr, through a proportional solenoid valve SC1 which will be described later in detail. Also, normally closed solenoid operated switching valves NCrl and NCfr (hereinafter, simply referred to as normally closed valves NCrl and NCfr) are each connected to a passage between each of the normally open valves NOrl and NOfr and each of the wheel brake cylinders Wrl and Wfr. The normally closed valves NCrl and NCfr are connected to a reservoir RS1 that stores the brake fluid drained from the wheel brake cylinders Wrl and Wfr. When each of the normally closed valves NCrl and NCfr is placed in an open position thereof, therefore, the hydraulic braking pressure in each of the wheel brake cylinders Wrl and Wfr is reduced.

The proportional solenoid valve SC1 as mentioned above is disposed between the master cylinder MC and the normally open valves NOrl and NOfr in the hydraulic circuit (HC1). In parallel with the proportional solenoid valve SC1, a relief valve RV1 is disposed so as to allow the brake fluid to flow from the normally open valves NOrl and NOfr toward the master cylinder MC when the hydraulic pressure at the side of the proportional solenoid valve SC1 exceeds a predetermined upper limit pressure. The proportional solenoid valve SC1 and relief valve RV1 serve as a proportional pressure difference valve device PD1, wherein the proportional solenoid valve SC1 is actuated to regulate a pressure difference between the hydraulic pressure at the side of the master cylinder MC and the hydraulic pressure at the side of the normally open valves NOrl and NOfr to be of a desired value, within the predetermined upper limit pressure provided by the relief valve RV1.

Furthermore, there is provided a hydraulic pressure pump HP1, which serves as an automatic hydraulic pressure generating device of the present invention, and which generates a hydraulic braking pressure independently of the master cylinder MC and irrespective of operation of the brake pedal BP, to supply the hydraulic braking pressure into a passage between the proportional solenoid valve SC1 and the normally open valves NOrl and NOfr. According to the present embodiment, an inlet of the hydraulic pressure pump HP1 is connected to the reservoir RS1, and connected to the master cylinder MC through an inlet valve SI1, which is formed by a normally closed solenoid operated switching valve. Thus, the normally open valves NOrl and NOfr or like constitute a pressure regulating device for regulating the hydraulic pressure in each wheel brake cylinder.

According to the present embodiment, a control unit MB includes a turning determination unit RT for determining whether a wheel out of the wheels operatively associated with the pair of wheel brake cylinders is located on the inside of a curve along which the vehicle is turning, or located on the outside of the curve, on the basis of state variable monitored by a vehicle state monitor SD, and a road holding determination unit ET for determining a state of road holding of the wheel determined to be located on the inside of the curve. And, a desired value (e.g., desired slip rate) for the wheel on the basis of the result determined by the turning determination unit RT to be located on the outside of the curve by a desired value setting unit ST1, at least on the basis of the result determined by the road holding determination unit ET. Then, the hydraulic braking pressure in the wheel brake cylinder operatively associated with the wheel located on the outside of the curve is regulated, in response to a result of comparison between the desired value and the state variable monitored by the vehicle state monitor SD, whereby a deceleration control for the vehicle is achieved.

According to the present embodiment, the vehicle state monitor SD is provided for monitoring the state variable of the vehicle, and includes a wheel speed detection device WS for detecting a wheel speed for each wheel of the wheels, a vehicle speed estimation unit VS for estimating a vehicle speed on each wheel on the basis of the detected wheel speed, and an actual slip rate calculation unit SA for calculating an actual slip rate for each wheel, on the basis of the estimated vehicle speed and the detected wheel speed. The control unit MB further includes an outside desired slip rate setting unit ST1 for setting a desired slip rate for the wheel (e.g., FR) located on the outside of the curve, and an outside slip rate deviation calculation unit SL1 for calculating a deviation between the desired slip rate for the wheel (FR) and the actual slip rate. Then, the pressure regulating device including the normally open valve NOfr or the like is controlled in response to the result calculated by the outside slip rate deviation calculation unit, to regulate the hydraulic braking pressure in the wheel brake cylinder operatively associated with the wheel located on the outside of the curve.

In addition, the vehicle state monitor SD includes a yaw rate detection device YD for detecting an actual yaw rate of the vehicle, which is fed to a control unit MB. The control unit MB of the present embodiment includes a desired yaw rate setting unit MY for setting a desired yaw rate for the wheel located on the inside of the curve, and a yaw rate deviation calculation unit MD, which calculates a deviation between the desired yaw rate and the actual yaw rate detected by the yaw rate detection device YD. It further includes an inside desired slip rate setting unit ST2 for setting a desired slip rate for the wheel (e.g., RL) located on the inside of the curve, on the basis of the deviation calculated by the yaw rate deviation calculation unit MD, and an inside slip rate deviation calculation unit SL2 for calculating a deviation between the desired slip rate and the actual slip rate for the wheel (RL) located on the inside of the curve. The pressure regulating device including the normally open valve NOrl or the like is controlled in response to the result calculated by the inside slip rate deviation calculation unit SL2, to regulate the hydraulic braking pressure in the wheel brake cylinder operatively associated with the wheel located on the inside of the curve.

In the case where the road holding determination unit ET determines that the wheel (RL) located on the inside of the curve is apart from a road, i.e., in its floating state, the desired value (desired slip rate) for the wheel (FR) located on the outside of the curve is set to be a predetermined value for undertaking the regulation by the pressure regulating device, e.g., a predetermined slip rate Stm. And, in the case where the road holding determination unit ET determines that the wheel located (RL) on the inside of the curve is on the road, i.e., in its road holding (contacting) state, the desired slip rate for the wheel (FR) located on the outside of the curve is set in response to a braking condition of at least one wheel out of the wheels except the wheel (RL) located on the inside of the curve and the wheel (FR) located on the outside of the curve. For example, when the brake pedal BP is depressed to turn on the brake switch BS, the desired slip rate is set to be a predetermined slip rate St0. If an anti-skid control is undertaken with respect to at least one wheel out of the wheels except the wheel (RL) located on the inside of the curve and the wheel (FR) located on the outside of the curve, the desired slip rate for the wheel (FR) located on the outside of the curve is modified so as to increase the braking force applied to the wheel (FR). If the anti-skid control is undertaken with respect to one wheel (e.g., FL), for example, the desired slip rate is set to be St1 (>St0), and if the anti-skid control is undertaken with respect to two wheels (e.g., FL and RR), the desired slip rates are set to be St2 (>St1, and <Stm).

According to the control unit MB, therefore, the hydraulic pressure pump HP1 is controlled, and the normally open valve NOfr, which is connected to the wheel brake cylinder Wfr, is placed in its closed position. In this state, in response to the result calculated by the inside slip rate deviation calculation unit SL2, the proportional solenoid valve SC1 is controlled, and the normally open valve NOrl and normally closed valve NCrl, which are connected to the wheel brake cylinder Wrl, are controlled, thereby to maintain the vehicle stability. During this control, if the wheel (RL) located on the inside of the curve has come to be apart from a road, to be positioned in its floating state, the hydraulic braking pressure in the wheel brake cylinder operatively associated with the wheel (FR) located on the outside of the curve is regulated in response to the result calculated by the outside slip rate deviation calculation unit SL1, as will be described later in detail with reference to FIGS. 6 and 7.

Figure 2:
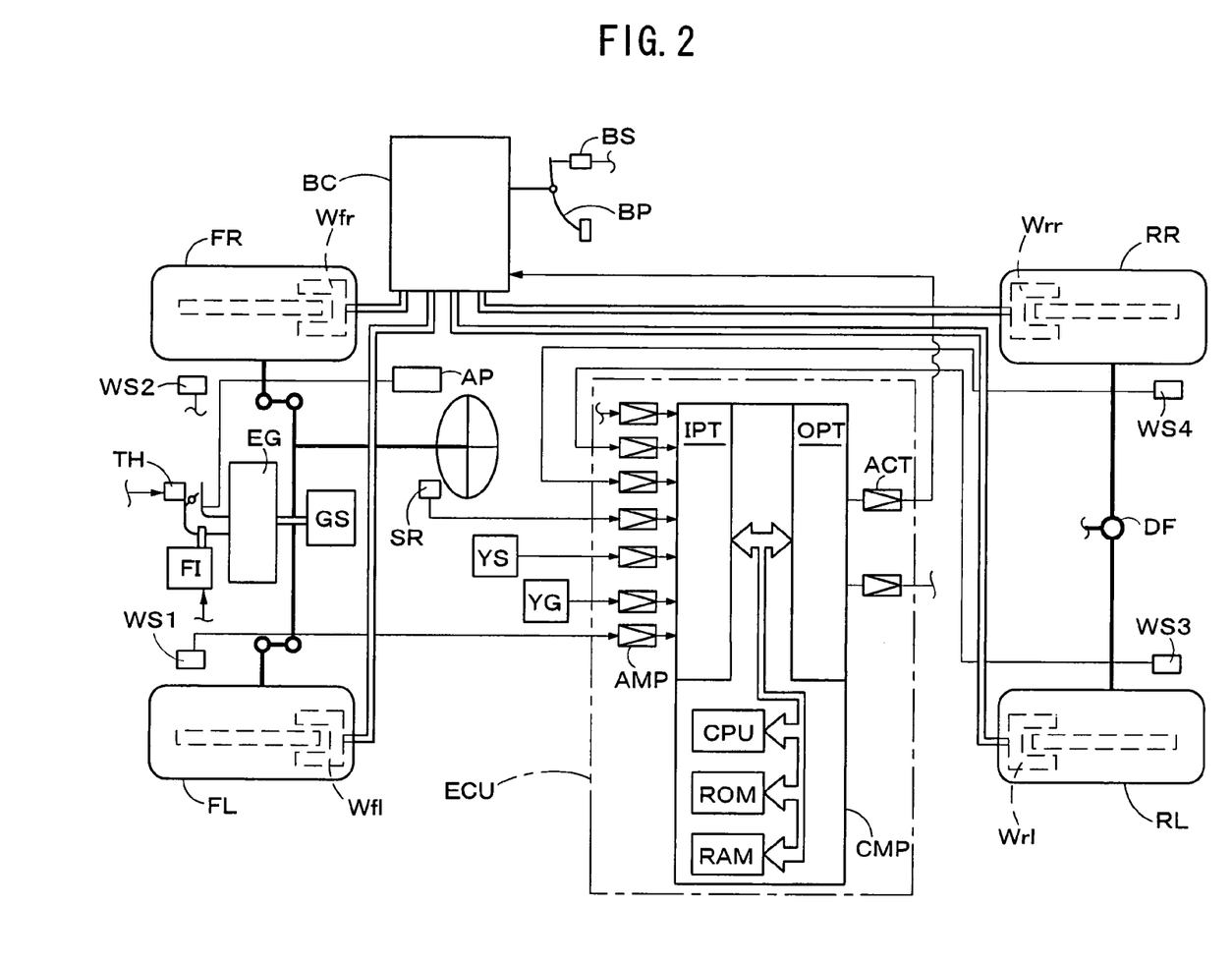
FIG. 2 is a schematic block diagram of a vehicle including a vehicle motion control apparatus according to an embodiment of the present invention.
Figure 3:
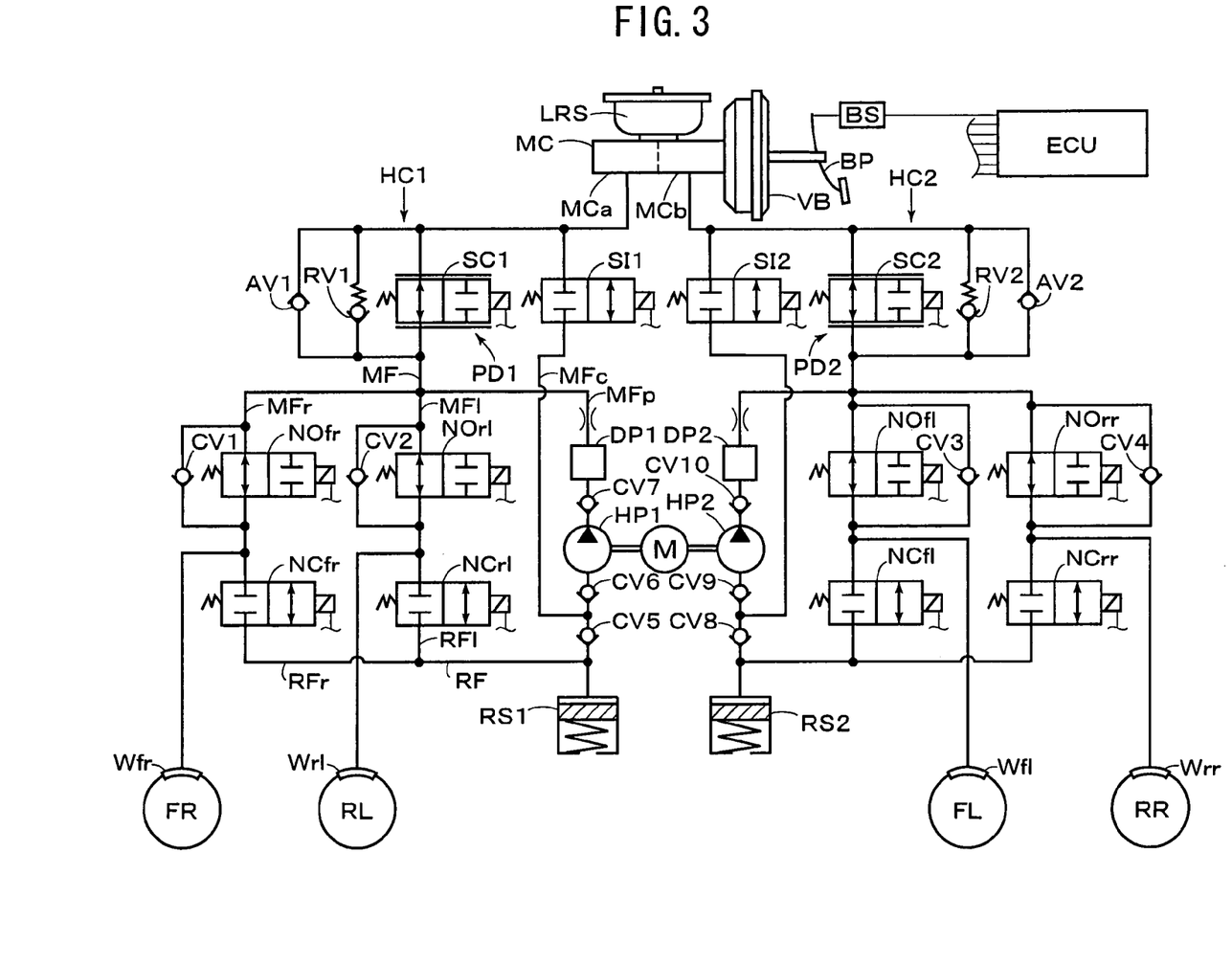
FIG. 3 is a block diagram illustrating a hydraulic brake system according to an embodiment of the present invention.

FIG. 2 shows a vehicle including the embodiment as shown in FIG. 1 and a hydraulic brake system as constituted in FIG. 3. In FIG. 2, the vehicle has an engine EG provided with a fuel injection apparatus FI and a throttle control apparatus TH which is adapted to control a throttle opening in response to operation of an accelerator pedal AP. Also, the throttle opening of the throttle control apparatus TH is controlled and the fuel injection apparatus FI is actuated to control the fuel injected into the engine EG, in response to output of the electronic control unit ECU, which serves as the control unit MB in FIG. 1. In FIG. 2, a wheel FL designates the wheel at the front left side as viewed from the position of a driver's seat, a wheel FR designates the wheel at the front right side, a wheel RL designates the wheel at the rear left side, and a wheel RR designates the wheel at the rear right side. These wheels are operatively associated with wheel brake cylinders Wfl, Wfr, Wrl and Wrr, respectively. According to the present embodiment, the engine EG is operatively connected with the rear wheels RL and RR through a transmission GS and a differential gear apparatus DF, which is controlled in response to output of the electronic control unit ECU, so that a shift-down can be made automatically to provide a so-called engine-brake for reducing a vehicle speed. Thus, a so-called rear drive system is constituted in FIG. 2, while the drive system is not limited to the rear drive system, but the present invention is applicable to a front drive system or a four-wheel drive system.

In the vicinity of the wheels FL, FR, RL and RR, there are provided wheel speed sensors WS1–WS4, respectively, which are connected to the electronic control unit ECU, and by which a signal having pulses proportional to a rotational speed of each wheel, i.e., a wheel speed signal is fed to the electronic control unit ECU. There are also provided a brake switch BS which turns on when the brake pedal BP is depressed, and turns off when the brake pedal BP is released, a steering angle sensor SR for detecting a steering angle of the vehicle, a yaw rate sensor YS for detecting a yaw rate of the vehicle, a lateral acceleration sensor YG for detecting a vehicle lateral acceleration, a throttle sensor (not shown) and the like. These are electrically connected to the electronic control unit ECU to control the engine EG and/or a hydraulic brake control apparatus BC, the latter of which will be explained later in detail with reference to FIG. 3.

Figure 4:
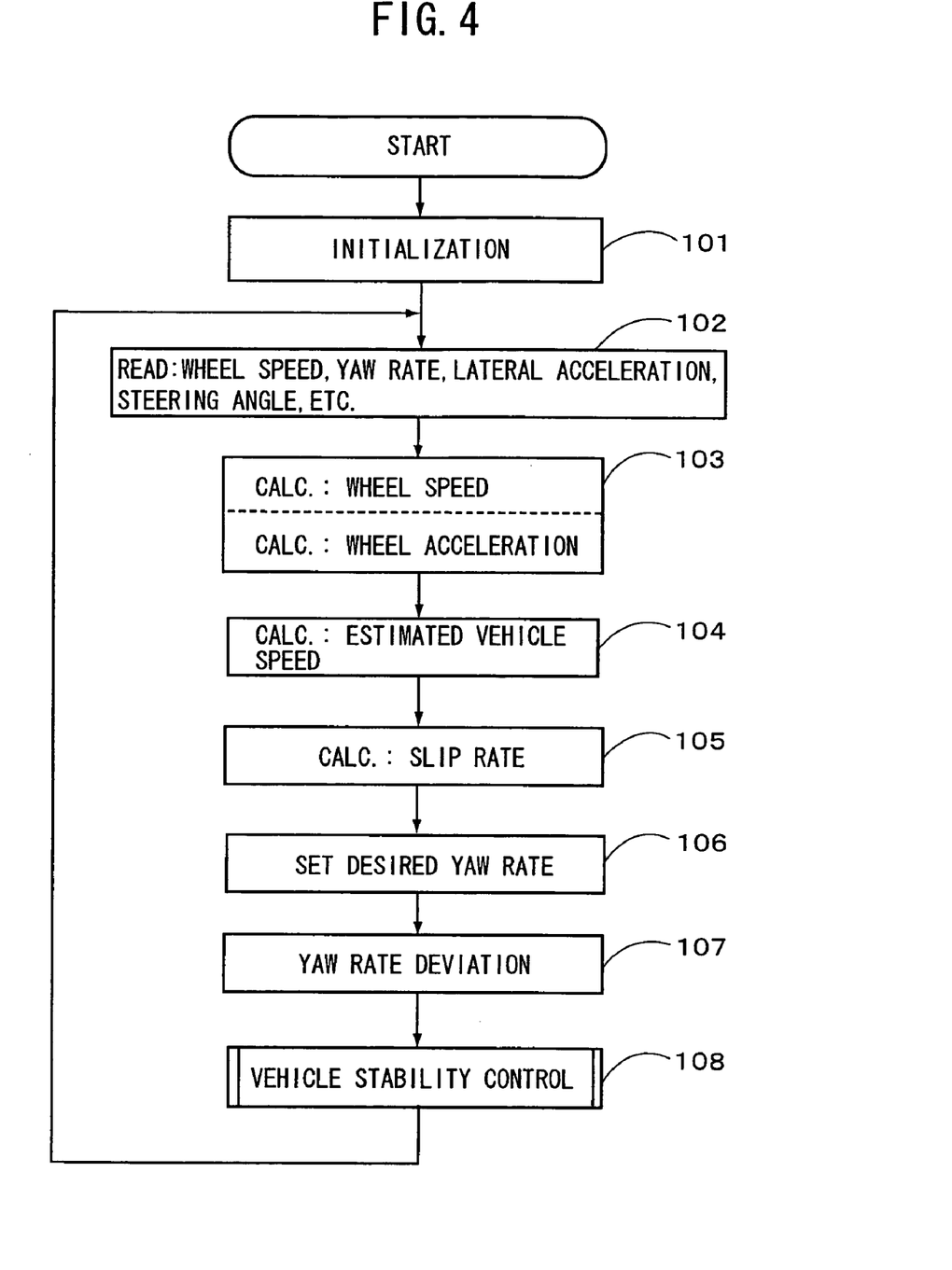
FIG. 4 is a flowchart showing a main routine of a vehicle motion control according to an embodiment of the present invention.
Figure 5:
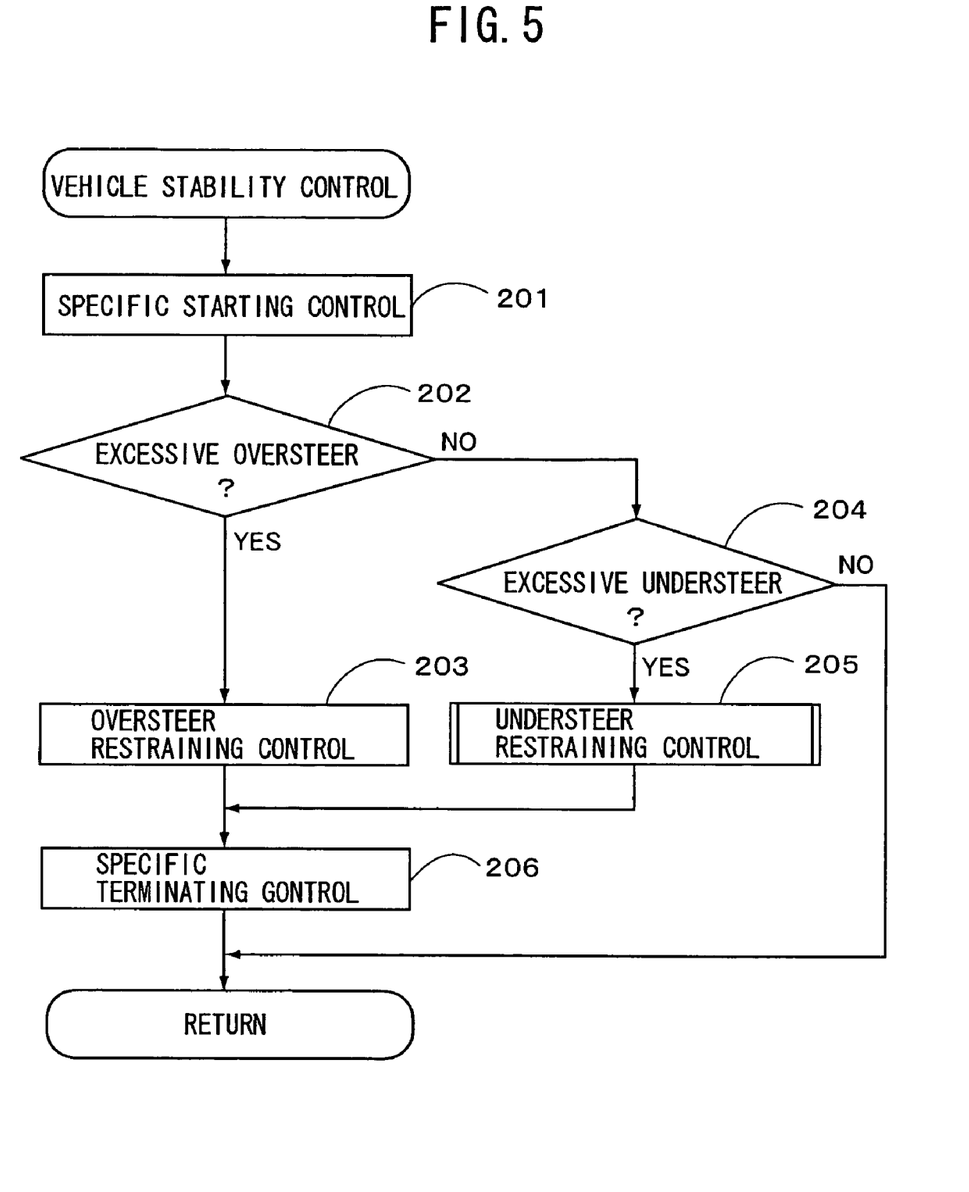
FIG. 5 is a flowchart showing a subroutine of a vehicle stability control according to an embodiment of the present invention.
Figure 6:
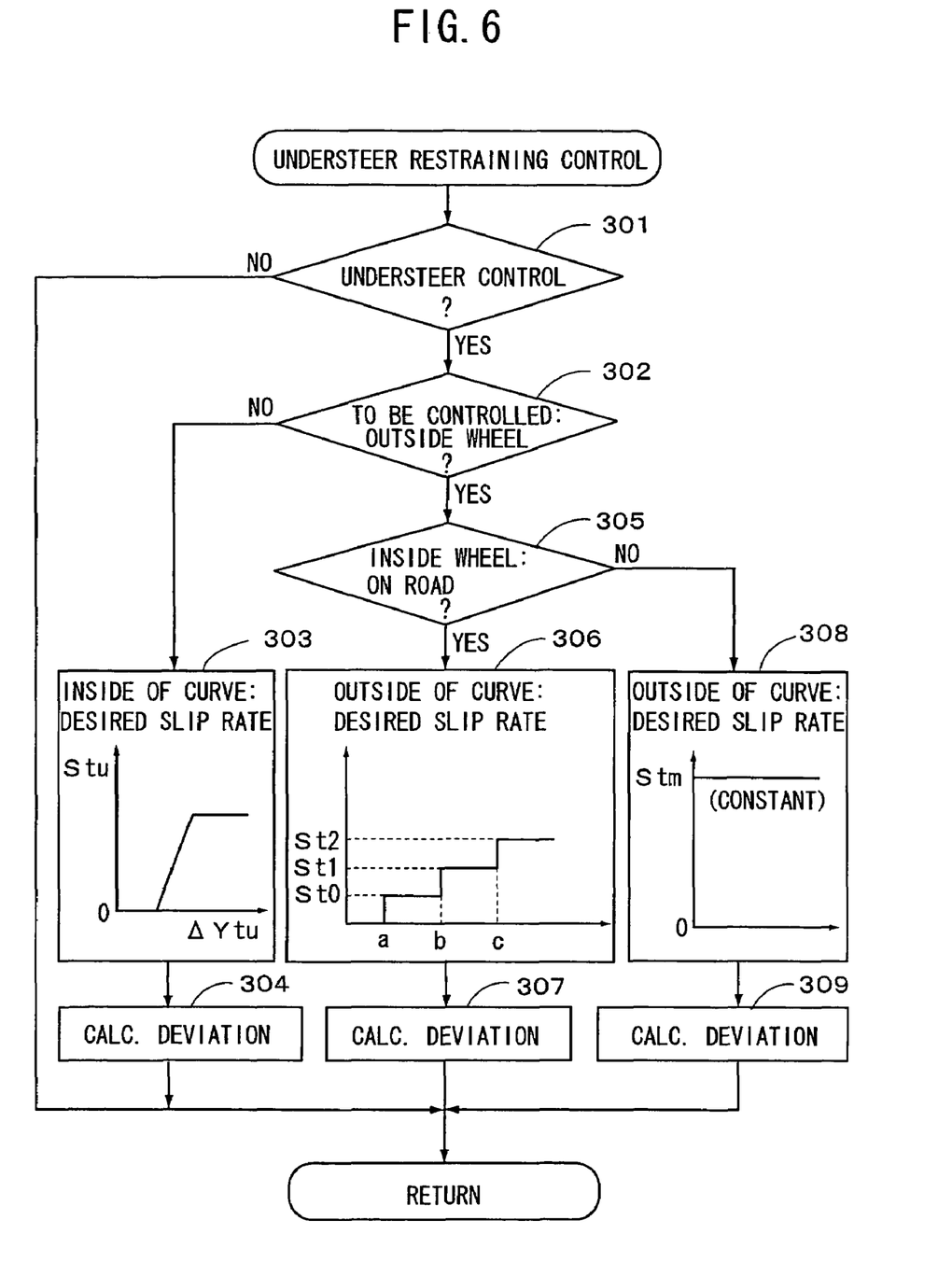
FIG. 6 is a flowchart showing a subroutine of understeer restraining control, according to an embodiment of the present invention.

As shown in FIG. 2, the electronic control unit ECU is provided with a microcomputer CMP which includes a central processing unit or CPU, a read-only memory or ROM, a random access memory or RAM, an input port IPT, an output port OPT and the like. The signals detected by the wheel speed sensors WS1–WS4, yaw rate sensor YS, lateral acceleration sensor YG, steering angle sensor SR, brake switch BS and the like are fed to the input port IPT via respective amplification circuits AMP and then to the central processing unit CPU. Then, control signals are fed from the output port OPT to the throttle control apparatus TH and hydraulic brake control apparatus BC via the respective driving circuits ACT. In the microcomputer CMP, the memory ROM memorizes a program corresponding to flow-charts as shown in FIGS. 4–6, the central processing unit CPU executes the program while the ignition switch (not shown) is closed, and the memory RAM temporarily memorizes variable data required to execute the program. In the electronic control unit ECU, therefore, the control unit MB as shown in FIG. 1 is constituted to operate as will be described later.

Next, referring to FIG. 3, will be explained the hydraulic brake system including the hydraulic brake control apparatus BC as described above. According to the present embodiment, a master cylinder MC is activated though a vacuum booster VB in response to depression of the brake pedal BP to pressurize the brake fluid in a low-pressure reservoir LRS and discharge the master cylinder pressure to the hydraulic circuits for the wheels FR and RL, and the wheels FL and RR, respectively. The master cylinder MC is of a tandem type having two pressure chambers communicated with the first and second hydraulic circuits HC1 and HC2, respectively. That is, a first pressure chamber MCa is communicated with a first hydraulic circuit HC1 for the wheels FR and RL, and a second pressure chamber MCb is communicated with a second hydraulic circuit HC2 for the wheels FL and RR. Thus, according to the present embodiment, the hydraulic circuit system is divided into two hydraulic circuits (HC1 and HC2) to form a diagonal circuit (so called X-circuit) system, while a front-rear dual circuit system may be formed.

In the first hydraulic circuit HC1 for the wheels FR and RL, the first pressure chamber MCa is communicated with wheel brake cylinders Wfr and Wrl, respectively, through a main hydraulic passage MF and its branch hydraulic passages MFr and MFl. In the main passage MF, there is disposed a normally open solenoid operated linear proportional valve SC1. Also, the first pressure chamber MCa is connected through an auxiliary hydraulic passage MFc to a passage between the check valves CV5 and CV6, which will be described later. In the auxiliary passage MFc, there is disposed a normally closed solenoid operated inlet valve SI1. In parallel with the proportional valve SC1, there are disposed a relief valve RV1 which prevents the brake fluid in the master cylinder MC from flowing to a downstream direction (toward the wheel brake cylinders Wfr and Wrl), and allows the brake fluid to flow toward the master cylinder MC when the braking pressure at the downstream side is more than the braking pressure at the master cylinder MC by a predetermined pressure difference, and a check valve AV1 which allows the flow of the brake fluid to the downstream direction (toward the wheel brake cylinders Wfr and Wrl), and prevents its reverse flow. The relief valve RV1 is provided for returning the brake fluid to the low-pressure reservoir LRS through the master cylinder MC when the pressurized braking pressure discharged from the hydraulic pressure pump HP1 is more than the braking pressure discharged from the master cylinder MC by the predetermined pressure difference, thereby to regulate the braking pressure discharged from the hydraulic pressure pump HP1 not to exceed a predetermined upper limit pressure. According to the present embodiment, therefore, the proportional pressure difference valve device PD1 is constituted by the relief valve RV1 and the proportional valve SC1. The proportional valve SC1 is controlled by the electronic control unit ECU, so that the pressure difference between the hydraulic pressure at the side of the master cylinder MC and the hydraulic pressure at the side of normally open two-port two position solenoid operated switching valves NOfr and NOrl is regulated to provide a desired pressure difference, within a range less than the predetermined upper limit pressure provided by the relief valve RV1. Because of the check valve AV1, even if the proportional valve SC1 is in its closed position, when the brake pedal BP is depressed, the hydraulic braking pressure in the wheel brake cylinders Wfr and Wrl can be increased.

The normally open valves NOfr and NOrl are disposed in the branch passages MFr and MFl, respectively, and in parallel therewith check valves CV1 and CV2 are disposed, respectively. The check valves CV1 and CV2 are provided for allowing the flow of the brake fluid toward the master cylinder MC and preventing the flow of the brake fluid toward the wheel brake cylinders Wfr and Wrl. The brake fluid in the wheel brake cylinders Wfr and Wrl is returned to the master cylinder MC, and then to the low-pressure reservoir LRS through the check valves CV1 and CV2, and the proportional valve SC1 placed in its first position as shown in FIG. 1. Accordingly, if the brake pedal BP is released, the hydraulic braking pressure in each of the wheel brake cylinders Wfr and Wrl is rapidly reduced to the pressure lower than the pressure at the master cylinder MC. And, normally closed valves NCfr and NCrl are disposed in the branch passages RFr and RFl, respectively, which merge into the drain passage RF connected to the reservoir RS1.

In the first hydraulic circuit HC1 for the wheels FR and RL, a hydraulic pressure pump HP1 is disposed in a passage MFp connected to the branch passages MFr and MFl at the upstream of the normally open valves NOfr and NOrl. The hydraulic pressure pump HP1 is connected to the reservoir RS1 at its inlet side through check valves CV5 and CV6, and connected at its outlet side to the normally open valves NOfr and NOrl through a check valve CV7 and a damper DP1. The hydraulic pressure pump HP1 is driven by a single electric motor M together with a hydraulic pressure pump HP2 to introduce the brake fluid from the inlet, pressurize the brake fluid to a predetermined pressure, and discharge it from the outlet. The reservoir RS1 is disposed independently of the low-pressure reservoir LRS of the master cylinder MC, and provided with a piston and a spring to function as an accumulator for storing a necessary volume of the brake fluid for various controls.

The master cylinder MC is connected to a passage between the check valves CV5 and CV6 disposed at the inlet side of the hydraulic pressure pump HP1 through the auxiliary passage MFc. The check valve CV5 is provided for preventing the flow of the brake fluid toward the reservoir RS1 and allowing the reverse flow. The check valves CV6 and CV7 are provided for restricting the flow of the brake fluid discharged from the hydraulic pressure pump HP1 in a predetermined direction, and generally formed within the hydraulic pressure pump HP1 in a body. Accordingly, the inlet valve SI1 is normally placed in its closed position as shown in FIG. 3, where the communication between the master cylinder MC and the inlet of the hydraulic pressure pump HP1 is blocked, and switched to its open position, where the master cylinder MC is communicated with the inlet of the hydraulic pressure pump HP1.

In the second hydraulic circuit HC2 for the wheels FL and RR, there are disposed a reservoir RS2 and a proportional solenoid valve SC2 which constitute the proportional pressure difference valve device PD2, damper DP2, normally closed two-port two-position solenoid operated inlet valve SI2, normally open valves NOfl and NOrr, normally closed valves NCfl and NCrr, check valves CV3, CV4 and CV8–CV10, relief valve RV2, and check valve AV2. The hydraulic pressure pump HP2 is driven by the electric motor M together with the hydraulic pressure pump HP1, both of the pumps HP1 and HP2 will be driven continuously after the motor M begins to operate them. The proportional valve SC2, inlet valve SI2 and normally open valves NOfl and NOrr, and normally closed valves NCfl and NCrr are controlled by the electronic control unit ECU to perform the vehicle stability control.

According to the hydraulic brake system as described above, every valves are placed in their normal positions as shown in FIG. 3, and the motor M is stopped, during the normal braking operation. When the brake pedal BP is depressed in the state as shown in FIG. 3, the master cylinder MC is actuated to discharge the master cylinder pressure from the first and second pressure chambers MCa and MCb to the first hydraulic circuit HC1 for the wheels FR and RL, and the second hydraulic circuit HC2 for the wheels FL and RR, respectively, and supply the hydraulic braking pressure into the wheel brake cylinders Wfr, Wrl, Wfl and Wrr, through the proportional valves SC1 and SC2, and the normally open valves NOfr, NOrl, NOfl and NOrr placed in their open positions. During the braking operation, when the wheel RL tends to be locked for example, and the anti-skid control is undertaken, the normally open valve NOfr for the other wheel FR is placed in its closed position to hold the hydraulic braking pressure therein. In the pressure decreasing mode, the normally open valve NOrl is placed in its closed position, and the normally closed valve NCrl is placed in its open position. As a result, the wheel brake cylinder Wrl is communicated with the reservoir RS1 through the normally closed valve NCrl, so that the brake fluid in the wheel brake cylinder Wrl is drained into the reservoir RS1 to reduce the hydraulic braking pressure in the wheel brake cylinder Wrl.

When a pulse-increase pressure mode is selected for the wheel brake cylinder Wrl, the normally closed valve NCrl is placed in its closed position and then the normally open valve NOrl is placed in its open position, so that the master cylinder pressure is supplied from the master cylinder MC to the wheel brake cylinder Wrl through the proportional valve SC1 and the normally open valve NOrl in their open positions. Then, the normally open valve NOrl is opened and closed alternately, so that the hydraulic braking pressure in the wheel brake cylinder Wrl is increased and held repeatedly like pulses thereby to be increased gradually. When a rapid increase pressure mode is selected for the wheel brake cylinder Wrl, the normally closed valve NCrl is placed in its closed position, and then the normally open valve NOrl is placed in its open position, so that the master cylinder pressure is supplied from the master cylinder MC to the wheel brake cylinder Wrl. When the brake pedal BP is released and the master cylinder pressure comes to be lower than the pressure in the wheel brake cylinder Wrl, the brake fluid in the wheel brake cylinder Wrl is returned to the master cylinder MC through the check valve CV2 and the proportional valve SC1 placed in its open position, and consequently to the low pressure reservoir LRS. Thus, an independent braking force control is performed with respect to each wheel.

According to the vehicle stability control, however, the proportional valve is actuated in accordance with the vehicle state to regulate the hydraulic pressure in the wheel brake cylinder for the wheel to be controlled (abbreviated to controlled wheel), in the normal state where the normally open valves are placed in their open positions and the normally closed valves are placed in their closed positions, without the aforementioned pressure decreasing control being made by placing the normally closed valve in its open position so as to reduce the hydraulic pressure in the wheel brake cylinder operatively associated with the controlled wheel. In the case where the wheel brake cylinder Wrl is to be controlled for the vehicle stability control, for example, the normally open valve NOfr provided for the wheel brake cylinder Wfr operatively associated with the wheel FR which is not to be controlled in the same hydraulic circuit, is placed in its closed position, whereas the proportional valve SC1 is actuated in accordance with the state variable of the vehicle to regulate the hydraulic pressure in the wheel brake cylinder Wrl to provide a desired pressure, with the normally open valve NOrl placed in its open position and the normally closed valve NCrl placed in its closed position (i.e., in their normal positions as shown in FIG. 3).

According to the present embodiment as constituted above, a program routine for the vehicle stability control is executed by the electronic control unit ECU, as will be described hereinafter with reference to FIG. 4. The program routine starts when an ignition switch (not shown) is turned on. At the outset, the program provides for initialization of the system at Step 101 to clear various data, and proceeds to Steps 102–108, which are repeated at a predetermined time period. At Step 102, read by the electronic control unit ECU are the signals indicative of the vehicle state such as wheel speed Vw, yaw rate Ya, lateral acceleration Gy, steering angle As and the like, which are detected by the wheel speed sensors WS1–WS4, yaw rate sensor YS, lateral acceleration sensor YG, steering angle sensor SR, brake switch BS and the like. Those signals are filtered, and stored in the memory. Then, the program proceeds to Step 103 where a reference wheel speed Vr of each wheel is calculated on the basis of the wheel speeds (Vw) output from the wheel speed sensors WS1–WS4, and it is differentiated to provide a wheel acceleration of each wheel. According to the present embodiment, the detected wheel speeds are converted into a speed on the gravity center of the vehicle, on the basis of which the reference wheel speed Vr is calculated for each wheel. Then, an estimated vehicle speed Vs is calculated at Step 104, and an actual slip rate Sa (=(Vs−Vr)/Vs), or wheel slip, is calculated at Step 105. The details of those calculations made at Steps 103–105 are described in detail in the Japanese Patent Laid-open publication No. 10-129441 as described before.

Next, at Step 106, on the basis of the state variable of the vehicle as described above, a desired yaw rate is calculated. In this embodiment, a desired yaw rate Yto for the oversteer restraining control and a desired yaw rate Ytu for the understeer restraining control are provided as follows:

At the outset, the desired yaw rate Yto is calculated on the basis of the lateral acceleration Gy and estimated vehicle speed V as described above, as [Yto=Gy/V]. Then, the desired yaw rate Ytu is calculated on the basis of the lateral acceleration Gy, steering angle As, estimated vehicle speed V and etc, as follows;

$$Ytu=Gy/V+C[(V \cdot As)/\{N \cdot L \cdot (1+K \cdot V^2)\}-Gy/V],$$

where "N" indicates a steering gear ratio, "L" indicates a wheelbase, "K" indicates a stability factor, and "C" indicates a weighted factor.

Then, calculated at Step 107 are a yaw rate deviation ΔYto (=Yto−Ya) between the actual yaw rate Ya detected by the yaw rate sensor YS and the desired yaw rate Yto, or a yaw rate deviation ΔYtu (=Ytu−Ya) between the actual yaw rate Ya and the desired yaw rate Ytu, on the basis of which the vehicle stability control is performed at Step 108, i.e., the control for restraining the excessive oversteer and/or the excessive understeer, as will be described later in detail with reference to FIG. 5. When the yaw rate deviation ΔYto is of negative value, it is determined that the vehicle is under the oversteer state, and otherwise it is under the understeer state.

Next, referring to FIG. 5, will be explained operation of the vehicle stability control. After a specific starting control is performed at Step 201 if necessary, the program proceeds to Step 202 where an absolute value of the deviation ΔYto is compared with a reference value K0. If it is determined that the absolute value of the yaw rate deviation (hereinafter, referred to as deviation) ΔYto is equal to or greater than the reference value Ko, it is determined that the vehicle is under the excessive oversteer state, the program proceeds to Step 203 where the oversteer restraining control is performed. On the contrary, if it is determined that the absolute value of the deviation ΔYto is smaller than the reference value Ko, the program proceeds to Step 204 where the deviation ΔYtu is compared with a reference value Ku. If it is determined that the deviation ΔYtu is equal to or greater than the reference value Ku, it is determined that the vehicle is under the excessive understeer state, the program proceeds to Step 205 where the understeer restraining control is performed. According to the present embodiment, with respect to the wheels operatively associated with the wheel brake cylinders included in a single hydraulic circuit, the wheel (e.g., FR) positioned at the front outside of the vehicle is selected as the wheel located on the outside of the curve with respect to a turning direction of the vehicle, and determined to be a wheel not to be controlled (abbreviated to uncontrolled wheel), and the wheel (RL) positioned at the rear inside of the vehicle on the diagonal line to the wheel (FR) is selected as the wheel located on the inside of the curve, and determined to be a wheel to be controlled (abbreviated to controlled wheel). Therefore, the braking force is applied to the latter wheel (RL), thereby to perform a so-called diagonal control system. In practice, in the normal vehicle's turning condition, the wheel cylinder pressure is held with respect to the wheel (FR) located on the outside of the curve, whereas the wheel cylinder pressure is regulated for the wheel brake cylinder (Wrl) operatively associated with the wheel (RL) located on the inside of the curve. After the control as described above is finished, a specific terminating control is performed at Step 206, and the program returns to the main routine as shown in FIG. 4.

According to the present embodiment, during the understeer restraining control performed at Step 205 for the wheel located on the inside of the curve (controlled wheel), if the controlled wheel is positioned in its floating state, the hydraulic braking pressure (wheel cylinder pressure) is regulated with respect to the wheel located on the outside of the curve (uncontrolled wheel), as well. Referring to FIG. 6, at the outset, it is determined at Step 301 whether the understeer restraining control is being performed (under control), or not. If the result is affirmative, the program proceeds to Step 302 where it is determined whether the wheel to be controlled in the present routine is the wheel located on the outside of the curve. If it is determined that the wheel to be controlled is the wheel located on the inside of the curve, the program proceeds to Step 303 where the desired slip rate Stu provided for the wheel (e.g., RL) located on the inside of the curve is set in response to the yaw rate deviation ΔYtu, according to a map as shown in Step 303. Then, the program proceeds to Step 304 where the slip rate deviation between the desired slip rate Stu and the actual slip rate Sa obtained at Step 105 is calculated (Stu−Sa), and returns to the routine as shown in FIG. 5. With respect to determination where the wheel is located on the inside or outside of the curve, the wheel speeds of right and left wheels may be compared, and if a difference between those wheel speeds exceeds a predetermined value, the wheel with the wheel speed thereof greater than that of the other wheel can be determined to be the wheel located on the outside of the curve, whereas the wheel with the wheel speed thereof smaller than that of the other wheel is determined to be the wheel located on the inside of the curve. Or, it may be determined which direction a steering wheel is turned from a neutral position (zero point) of steering angle to the side of positive value or the side of negative value, so that the wheel positioned at a side opposite to the steered direction can be determined to be the wheel located on the outside of the curve. Any other known methods for determining it may be employed.

In contrast, if it is determined at Step 302 that the wheel to be controlled in the present routine is the wheel located on the outside of the curve, the program proceeds to Step 305 where it is determined whether the wheel (RL) located on the inside of the curve is on the road, in other words, whether it is not positioned in its floating state, according to a known method as will be described later with reference to FIG. 7. If the wheel (RL) located on the inside of the curve is on the road, then the desired slip rate provided for the wheel (FR) located on the outside of the curve is set according to a map as shown in Step 306. For example, normally, the desired slip rate is set to be zero, and the wheel cylinder pressure in the wheel brake cylinder operatively associated with the wheel (FR) located on the outside of the curve is held. In the case (a) where the brake pedal BP is depressed to turn on the brake switch BS, the desired slip rate is set to be "St0". In the case (b) where the anti-skid control is undertaken with respect to one wheel (e.g., FL), the desired slip rate is set to be "St1". And, in the case (c) where the anti-skid control is undertaken with respect to two wheels (e.g., FL and RR), the desired slip rate is set to be "St2". Thereafter, the program proceeds to Step 307 where the slip rate deviation between each desired slip rate and the actual slip rate Sa obtained at Step 105 is calculated, and returns to the routine as shown in FIG. 5.

Then, if it is determined at Step 305 that the wheel (RL) located on the inside of the curve is not on the road, the program proceeds to Step 308 where the desired slip rate for the wheel (FR) is set to be the slip rate Stm (maximum value), which is equal to or greater than a threshold value for undertaking the control unit MB to control the pressure regulating device as described before. Thereafter, the program proceeds to Step 309 where the slip rate deviation between the desired slip rate and the actual slip rate Sa obtained at Step 105 is calculated to fulfill the condition for beginning the pressure regulation, and returns to the routine as shown in FIG. 5.

Figure 7:
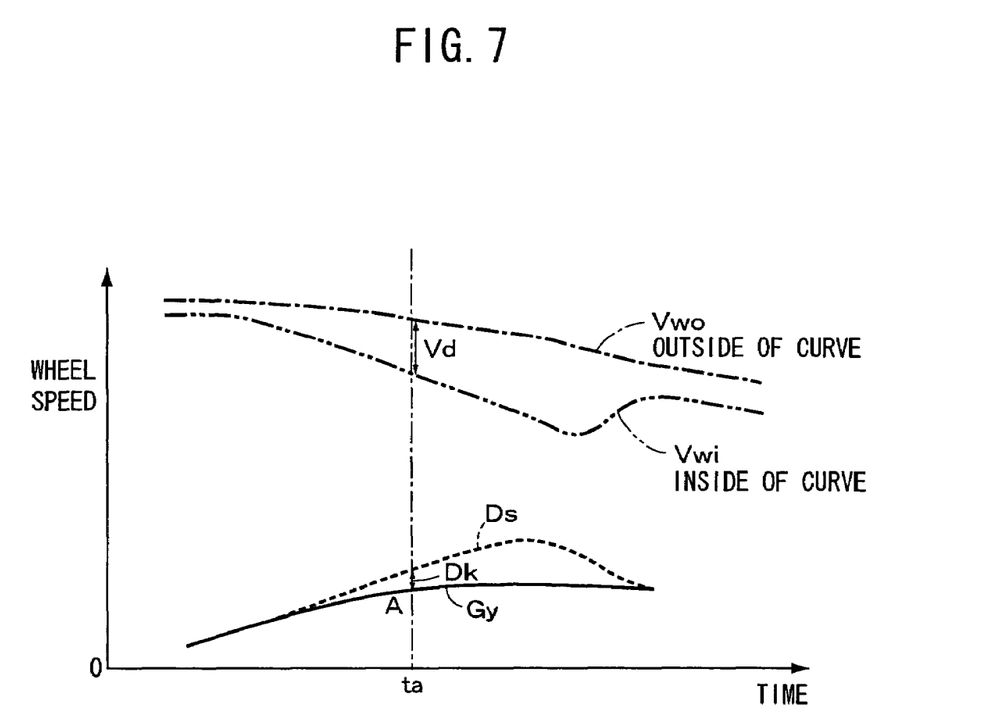
FIG. 7 is a diagram showing a determination whether a wheel located on the inside of the curve is on a road, according to an embodiment of the present invention.

With respect to determination made at Step 305 whether the wheel located on the inside of the curve is on the road or not, FIG. 7 shows a wheel speed Vwo of the wheel located on the outside of the curve as indicated by one-dot chain line, and a wheel speed Vwi of the wheel located on the inside of the curve as indicated by two-dot chain line. Referring FIG. 7, therefore, when a reference value (Ds), which is obtained on the basis of a wheel speed difference (Vd) between the wheels located on the inside and outside of the curve, has exceeded a predetermined value (Dk), at the time "ta" in FIG. 7, it can be determined that the wheel located on the inside of the curve is remote from the road to be positioned in its floating state. In this case, as for the reference value Ds, employed is an estimated lateral acceleration (Vs·Vd/Lt), wherein "Lt" is a tread length. As for the predetermined value Dk, employed is a value (Gy+Gm) obtained by adding a predetermined margin Gm to the lateral acceleration Gy detected by the lateral acceleration sensor YG. Therefore, when such a relationship as Ds (=Vs·Vd/Lt)>Dk (=Gy+Gm) has been provided, it can be determined that the wheel located on the inside of the curve is positioned in its floating state. In FIG. 7, a solid line indicates the lateral acceleration Gy, and a broken line indicates the reference value Ds.

It should be apparent to one skilled in the art that the above-described embodiments are merely illustrative of but a few of the many possible specific embodiments of the present invention. Numerous and various other arrangements can be readily devised by those skilled in the art without departing from the spirit and scope of the invention as defined in the following claims.

What is claimed is:

1. A vehicle motion control apparatus comprising:
    wheel brake cylinders operatively associated with wheels of a vehicle, respectively;
    a master cylinder connected to said wheel brake cylinders through a dual hydraulic circuit with a pair of wheel brake cylinders included in each hydraulic circuit, said master cylinder discharging a hydraulic braking pressure into each hydraulic circuit in response to operation of a brake pedal;
    hydraulic pressure regulating means disposed between said master cylinder and said pair of wheel brake cylinders, for regulating the hydraulic braking pressure supplied into each of said pair of wheel brake cylinders;
    vehicle state monitor means for monitoring state variable of said vehicle;
    turning determination means for determining whether a wheel out of said wheels of said vehicle operatively associated with said pair of wheel brake cylinders is located on the inside of a curve along which said vehicle is turning, or located on the outside of the curve;
    road holding determination means for determining a state of road holding of said wheel determined by turning determination means to be located on the inside of the curve;
    desired value setting means for setting a desired value for said wheel determined by turning determination means to be located on the outside of the curve, at least in response to the result determined by said road holding determination means; and
    control means for controlling said pressure regulating means in response to a result of comparison between the desired value set by said desired value setting means and the state variable monitored by said vehicle state monitor means, to regulate the hydraulic braking pressure in said wheel brake cylinder operatively associated with said wheel located on the outside of the curve.

2. A vehicle motion control apparatus as set forth in claim 1, wherein said desired value setting means sets the desired value for said wheel located on the outside of the curve to be a predetermined value for beginning the regulation by said pressure regulating means, when said road holding determination means determines that said wheel located on the inside of the curve is apart from a road, and wherein said desired value setting means sets the desired value for said wheel located on the outside of the curve, on the basis of a braking condition of at least one wheel out of said wheels of said vehicle except said wheel located on the inside of the curve and said wheel located on the outside of the curve, when said road holding determination means determines that said wheel located on the inside of the curve is on the road.

3. A vehicle motion control apparatus as set forth in claim 2, wherein said desired value setting means modifies the desired value for said wheel located on the outside of the curve to increase the braking force applied thereto, when an anti-skid control is performed by said control means for at least said one wheel except said wheel located on the inside of the curve and said wheel located on the outside of the curve.

4. A vehicle motion control apparatus as set forth in claim 3, wherein said desired value setting means modifies the desired value for said wheel located on the outside of the curve to increase the braking force applied thereto, in response to the number of wheels for which the anti-skid control is performed, except said wheel located on the inside of the curve and said wheel located on the outside of the curve.

5. A vehicle motion control apparatus as set forth in claim 1, wherein said vehicle state monitor means comprises;
wheel speed detection means for detecting a wheel speed for each wheel of said wheels,
vehicle speed estimation means for estimating a vehicle speed on each wheel on the basis of the wheel speed detected by said wheel speed detection means, and
actual slip rate calculation means for calculating an actual slip rate for each wheel, on the basis of the vehicle speed estimated by said vehicle speed estimation means and the wheel speed detected by said wheel speed detection means, and
wherein said control means comprises;
outside desired slip rate setting means for setting a desired slip rate for said wheel located on the outside of the curve, and
outside slip rate deviation calculation means for calculating a deviation between the desired slip rate set by said outside desired slip rate setting means and the actual slip rate calculated by said actual slip rate calculation means, and
wherein said control means controls said pressure regulating means in response to the result calculated by said outside slip rate deviation calculation means, to regulate the hydraulic braking pressure in said wheel brake cylinder operatively associated with said wheel located on the outside of the curve.

6. A vehicle motion control apparatus as set forth in claim 5, wherein said vehicle state monitor means includes yaw rate detection means for detecting an actual yaw rate of said vehicle, and wherein said control means comprises;
desired yaw rate setting means for setting a desired yaw rate for said wheel located on the inside of the curve,
yaw rate deviation calculation means for calculating a deviation between the desired yaw rate set by said desired yaw rate setting means and the actual yaw rate detected by said yaw rate detection means,
inside desired slip rate setting means for setting a desired slip rate for said wheel located on the inside of the curve, on the basis of the deviation calculated by said yaw rate deviation calculation means, and
inside slip rate deviation calculation means for calculating a deviation between the desired slip rate set by said inside desired slip rate setting means and the actual slip rate calculated by said actual slip rate calculation means, and
wherein said control means controls said pressure regulating means in response to the result calculated by said inside slip rate deviation calculation means, to regulate the hydraulic braking pressure in said wheel brake cylinder operatively associated with said wheel located on the inside of the curve.

7. A vehicle motion control apparatus as set forth in claim 1, wherein said hydraulic pressure regulating means in each of said hydraulic circuits comprises;
normally open switching valves each disposed between said master cylinder and each of said pair of wheel brake cylinders, each of said normally open switching valves supplying the hydraulic braking pressure discharged from said master cylinder into each of said pair of wheel brake cylinders when each of said normally open switching valves is placed in an open position thereof,
normally closed switching valves each connected to a passage between each of said normally open switching valves and each of said pair of wheel brake cylinders, each of said normally closed switching valves reducing the hydraulic braking pressure in each of said pair of wheel brake cylinders when each of said normally closed switching valves is placed in an open position thereof,
proportional pressure difference valve means disposed between said master cylinder and said normally open switching valves in each hydraulic circuit, said valve means regulating a pressure difference between the hydraulic pressure at the side of said master cylinder and the hydraulic pressure at the side of said normally open switching valves to provide a desired pressure difference, and
automatic hydraulic pressure generating means for generating a hydraulic braking pressure independently of said master cylinder and irrespective of operation of said brake pedal, and supplying the hydraulic braking pressure into a passage between said valve means and said normally open switching valves in each hydraulic circuit, and
wherein said control means controls said normally open switching valve connected to one of said wheel brake cylinders not to be controlled in one hydraulic circuit of said dual hydraulic circuits, to be placed in the closed position, and controls said pressure generating means in response to the result of comparison between the desired value and the state variable of said vehicle monitored by said vehicle state monitor means, and wherein said control means controls said valve means, with said normally open switching valve connected to said wheel brake cylinder operatively associated with said wheel to be controlled, being placed in the open position.

* * * * *